United States Patent
Faccin

(10) Patent No.: US 8,467,782 B1
(45) Date of Patent: *Jun. 18, 2013

(54) SYSTEM AND METHOD FOR MULTIPLE PACKET DATA NETWORK CONNECTIVITY

(75) Inventor: Stefano Faccin, Fremont, CA (US)

(73) Assignee: Marvell International, Ltd., Hamilton (BM)

( * ) Notice: Subject to any disclaimer, the term of this patent is extended or adjusted under 35 U.S.C. 154(b) by 915 days.

This patent is subject to a terminal disclaimer.

(21) Appl. No.: 12/116,640

(22) Filed: May 7, 2008

Related U.S. Application Data

(60) Provisional application No. 60/916,424, filed on May 7, 2007.

(51) Int. Cl.
*H04W 4/00* (2009.01)

(52) U.S. Cl.
USPC ..... 455/432.1; 370/310; 370/328; 455/422.1; 455/425; 455/435.2

(58) Field of Classification Search
USPC ............... 370/277, 310, 328; 455/422.1, 425, 455/432, 432.1, 432.2, 433, 434, 435.1, 435.2
See application file for complete search history.

(56) References Cited

U.S. PATENT DOCUMENTS

| | | | |
|---|---|---|---|
| 7,230,951 B2 * | 6/2007 | Mizell et al. | 370/401 |
| 7,349,402 B2 * | 3/2008 | Isomaki et al. | 370/395.2 |
| 7,817,618 B2 * | 10/2010 | Hurtta | 370/351 |
| 2008/0247346 A1 * | 10/2008 | Gulbani et al. | 370/310 |
| 2009/0161575 A1 * | 6/2009 | Zhao et al. | 370/254 |
| 2010/0054222 A1 * | 3/2010 | Rune | 370/338 |
| 2010/0150057 A1 * | 6/2010 | Miklos et al. | 370/328 |

FOREIGN PATENT DOCUMENTS

WO   WO 2008110215 A1 *   9/2008

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999; 531 pages.

IEEE P802.11g/D8.2, Apr. 2003 (Supplement to ANSI/IEEE Std 802.11-1999(Reaff 2003)); DRAFT Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

(Continued)

*Primary Examiner* — Anthony Addy
*Assistant Examiner* — Michael S Bush

(57) ABSTRACT

A mobile communication terminal includes an attachment module that provides a request to attach to a home network through a visited network when the mobile communication terminal is roaming. The mobile communication terminal also includes a response module that receives a response to the request to attach from the home network that includes first and second Internet protocol (IP) addresses. The mobile communication terminal also includes a communication module that communicates with a first packet data network (PDN) through the home network by selectively using the first IP address and that communicates with a second PDN through the visited network by selectively using the second IP address.

26 Claims, 11 Drawing Sheets

OTHER PUBLICATIONS

IEEE 802.11n; IEEE 802.11-04/0889r6; IEEE P802.11 Wireless LANs; TGn Sync Proposal Technical Specification; Syed Aon Mujtaba; Agere Systems Inc.; May 18, 2005; 131 pages.

IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 1999; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.16-2001™ IEEE Standard for Local and metropolitan area networks; Part 16: Air Interface for Fixed Broadband Wireless Access Systems; IEEE Computer Society and the IEEE Microwave Theory and Techniques Society; Apr. 8, 2002; 348 pages.

IEEE Std 802.16-2004 (Revision of IEEE Std 802.16-2001) IEEE Standard for Local and metropolitan area networks; Part 16: Air Interface for Fixed Broadband Wireless Access Systems; IEEE Computer Society and the IEEE Microwave Theory and Techniques Society; Oct. 1, 2004; 893 pages.

IEEE Std 802.11h™-2003 [Amendment to IEEE Std 802.11™, 1999 Edition (Reaff 2003) as amended by IEEE Stds 802.11a™-1999, 802.11b™-1999, 802.11b™-1999/Cor 1-2001, 802.11d™-2001, 802.11g™-2003]; IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 5: Spectrum and Transmit Power Management Extensions in the 5 GHz band in Europe; IEEE Computer Society; LAN/MAN Standards Committee; Oct. 14, 2003; 75 pages.

IEEE 802.20-PD-06; IEEE P 802.20™ V14; Jul. 16, 2004; Draft 802.20 Permanent Document; System Requirements for IEEE 802.20 Mobile Broadband Wireless Access Systems—Version 14; 24 pages.

3GPP TS 23.228 V8.4.0 (Mar. 2008); $3^{rd}$ Generation Partnership Project; Technical Specification Group Services and System Aspects; IP Multimedia Subsystem (IMS); Stage 2 (Release 8); 234 pages.

3GPP TS 23.401 V8.1.0 (Mar. 2008); $3^{rd}$ Generation Partnership Project; Technical Specification Group Services and System Aspects; General Packet Radio Service (GPRS) enhancements for Evolved Universal Terrestrial Radio Access Network (E-UTRAN) access (Release 8); 171 pages.

3GPP TS 23.402 V8.1.1 (Mar. 2008); $3^{rd}$ Generation Partnership Project; Technical Specification Group Services and System Aspects; Architecture enhancements for non-3GPP accesses (Release 8); 163 pages.

* cited by examiner

SYSTEM AND METHOD FOR MULTIPLE PACKET DATA NETWORK CONNECTIVITY

CROSS-REFERENCE TO RELATED APPLICATIONS

This application claims the benefit of U.S. Provisional Application No. 60/916,424, filed on May 7, 2007. The disclosure of the above application is incorporated herein by reference in its entirety.

FIELD

The present disclosure relates to communication systems, and more particularly to protocols for managing connectivity and mobility of network devices relative to remote networks.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIG. 1, an exemplary network system 10 includes a plurality of user equipment terminals (UE) 12-1, 12-2, . . . , and 12-N (collectively referred to as UE 12) that may include wireless terminals. Examples of wireless terminals include mobile phones, personal digital assistants (PDAs) and computers. The UE 12 may communicate with a home network 13 via a visited network 14. The home and visited networks 13, 14 may each include networks of service providers that may be in different countries, respectively. The home and visited networks 13, 14 may also each communicate with one or more packet data networks (PDNs) 15-1, 15-2. The PDNs 15-1, 15-2 communicate data as packets via Internet protocol (IP) addresses. An exemplary PDN is the Internet.

The home network 13 may include a home public land mobile network (HPLMN), and the visited network 14 may include a visited public land mobile network (VPLMN) of a 3$^{rd}$ Generation Partnership Project (3GPP™) network system. An exemplary home network 13 communicates with one or more visited networks.

Referring now to FIG. 2, the network system 10 is illustrated in more detail. The home network 13 includes a home PDN gateway 16 and an authentication/authorization/accounting (AAA) server 18. The PDN gateway 16 may communicate with a first PDN 15-1, such as the Internet. An exemplary UE 12 connects to the home network 13 via the visited network 14 through an attachment point. Once attachment to the home and visited networks 13, 14 is successful, the UE 12 may then connect to the first PDN 15-1. For example, the UE 12 may be a cellular phone. When the cellular phone roams into the visited network 14, either the visited network 14 or the cellular phone initiates attachment. If the attachment is successful, then, when the cellular phone requires use of network resources, such as access to another cellular phone in the first PDN 15-1, the cellular phone connects to the first PDN 15-1.

The visited network 14 includes one or more attachment points (collectively referred to as attachment points 20). For purposes of illustration, five attachment points 20-1, 20-2, 20-3, 20-4, and 20-5 are shown. The attachment points 20 may include any suitable wireless or wired interface. For purposes of illustration, the attachment point 20-1 may include a 3GPP interface. The attachment point 20-1 may use the Universal Mobile Telecommunications System (UMTS), a Long Term Evolution (LTE) Radio Access Network (RAN) and/or an Evolved Universal Terrestrial Radio Access Network (EUTRAN).

For purposes of illustration, the attachment point 20-2 may include a Worldwide interoperability for Microwave Access (WiMAX) interface. The attachment point 20-3 may include a wired interface, such as a cable modem or a Digital Subscriber Line (DSL). The attachment point 20-4 may include a 3GPP-2 interface, which may use Code Division Multiple Access 2000 (CDMA2000). The attachment point 20-5 may include a Wireless Local Area Network (WLAN) interface.

The attachment points 20 may communicate with other networks, such as the home network 13, via a serving gateway 22, which therefore acts as an anchoring point. The serving gateway 22 may also include switching and routing functionality to allow the attachment points 20 to communicate between each other. The visited network 14 may include an AAA proxy server 24, which communicates with the AAA server 18 of the home network 13.

The serving gateway 22 may communicate with a second PDN gateway 26 of the visited network 14. The second PDN gateway 26 may communicate with a second PDN 15-2. The serving gateway 22 may provide a different IP address for each PDN 15-1, 15-2 from the respective gateways 16, 26. The UE 12 may not be aware of the multiple IP addresses and may always initiate network communications with and connect to the first PDN 15-1 of the home network 13 via the visited network 14. The home network 13 may then allow "local breakout" to occur. Local breakout involves the UE 12 communicating with a device in the second PDN 15-2, which may be local to the visited network 14. Prior to local breakout, the UE 12 and the first PDN 15-1 sever connectivity.

For purposes of illustration, the UE 12 is shown attached to the attachment point 20-1. When the UE 12 initiates the attachment to the attachment point 20-1, the attachment point 20-1 determines whether the UE 12 is authorized by querying the AAA proxy server 24. The AAA proxy server 24 may identify the AAA server 18 based on identification information from the UE 12, and request authorization information from the AAA server 18.

The AAA proxy server 24 may cache data from the UE 12 for a specified period of time or for as long as the UE 12 is attached to one of the attachment points 20 of the visited network 14. In addition, the AAA server 18 may provide an expiration time for this authorization information. The authorization information may include whether the UE 12 is authorized to connect to the visited network 14, what resources the UE 12 should be offered, and what quality of service the UE 12 should be guaranteed.

In various implementations, the AAA proxy server 24 may provide the address of the AAA server 18 to the attachment point 20-1, which then queries the AAA server 18 directly. Access and authorization may be provided by any suitable method, including a home subscriber server (HSS).

Connections between the UE 12 and gateways 16, 22, 26 may be referred to as tunnels. The UE 12 may exchange information and access resources through the tunnels. When tunnels are set-up between the PDN gateways 16, 26 and the UE 12, the UE is considered connected to the respective PDNs 15-1, 15-2. Assuming that the UE 12 is authorized to attach, a first tunnel is created between the attachment point 20-1 and the serving gateway 22. A second tunnel is created between the serving gateway 22 and the first PDN gateway 16. If the UE 12 requests communication with a device in the second PDN 15-2, and the home network 13 grants the request, the second tunnel is closed. A third tunnel is then created between the serving gateway 22 and the second PDN gateway 26. However, if the UE 12 switches from the attachment point 20-1 to another of the attachment points 20, or to another 3GPP attachment point (not shown), only the first tunnel may be modified.

Referring now to FIG. 3, an example of a timeline of steps performed when the UE 12 connects to the home network 13 via the visited network 14 is presented. The UE 12 may be a first cell phone that connects with the first PDN 15-1, which may be the Internet. The UE 12 performs access and authentication with the attachment point, such as the attachment point 20-1. This may include communicating with the AAA server 18. Upon authentication, the UE 12 attempts to attach to the attachment point 20-1. The AAA server may use an identifier of the UE 12, such as a network address identifier, that uniquely identifies the UE 12.

The UE 12 may request an IP address from the attachment point 20-1. The attachment point 20-1 may determine that there is a home network 13 and may request the serving gateway 22 to enable communications with the home network 13. The attachment point 20-1 may also provide an indication that the attachment point 20-1 is bound to the UE 12. The serving gateway 22 in turn communicates with the home network 13 and requests an IP address, $IP_1$, from the PDN gateway 16.

The serving gateway 22 sends binding acknowledgement messages to the attachment point 20-1 from the PDN gateway 16. The binding acknowledgement messages include $IP_1$. A tunnel is then set up between the serving gateway 22 and the PDN gateway 16 for transmission of packets to and from the UE 12. The attachment point 20-1 then assigns $IP_1$ to UE 12. The UE 12 may not be aware that it is connected to the visited network 14.

If the home network 13 is aware that the second PDN 15-2 includes a device that the UE 12 is attempting to communicate with, the home network 13 may allow local breakout to the second PDN 15-2. However, this allowance is after connection to the home network 13 and first PDN 15-1 has been established, as previously discussed regarding the timeline of FIG. 3. Communications and connection to the first PDN 15-1 are then halted, and the serving gateway 22 requests an IP address, $IP_2$, from the second PDN gateway 26. The serving gateway 22 sends binding acknowledgement messages to the attachment point 20-1 from the second PDN gateway 26. The binding acknowledgement messages include $IP_2$. A tunnel is then set up between the serving gateway 22 and the second PDN gateway 26 for transmission of packets to and from the UE 12.

SUMMARY

A mobile communication terminal includes an attachment module that provides a request to attach to a home network through a visited network when the mobile communication terminal is roaming. The mobile communication terminal also includes a response module that receives a response to the request to attach from the home network that includes first and second Internet protocol (IP) addresses. The mobile communication terminal also includes a communication module that communicates with a first packet data network (PDN) through the home network by selectively using the first IP address and that communicates with a second PDN through the visited network by selectively using the second IP address.

In other features, the request to attach includes access point names (APNs) that identify at least one of the first and second PDNs. The response includes a first of the APNs appended to the first IP address and a second of the APNs appended to the second IP address. The response includes the first IP address and the second IP address arranged in a predetermined order. The communication module selectively communicates with the first and second PDNs based on the predetermined order. The response includes the first IP address tagged with first identifiers that identify that the first IP address is used for communications with at least one of the home network and the first PDN.

In other features, the response includes the second IP address tagged with second identifiers that identify that the second IP address is used for communications with at least one of the visited network and the second PDN. The mobile communication terminal also includes a connection module that sets up connectivity with the home and visited networks in one of parallel and series. The connection module sets up connectivity with the home and visited networks when the mobile communication terminal is attaching to the home network.

In other features, the response indicates that the mobile communication terminal has permission to selectively connect remotely to the first and second PDNs. The mobile communication terminal also includes a request module that generates the request to attach. The request to attach includes a request to use the first and second PDNs. The mobile communication terminal also includes an analysis module. The analysis module determines that the mobile communication terminal is authorized to connect to at least one of the first PDN using the first IP address and the second PDN using the second IP address based on the response from the home network.

In other features, the mobile communication terminal also includes memory that stores a profile of the mobile communication terminal. The profile includes at least one of a type of the mobile communication terminal and a capability of the mobile communication terminal. The capability includes a restriction that limits use of at least one of the first and second PDNs. The attachment module initiates authentication of the mobile communication terminal with the home network during the attachment with the home network. The network system also includes a cellular network interface and a network interface. The mobile communication terminal communicates with the visited network via at least one of the cellular network interface and the network interface.

In other features, a network system includes the mobile communication terminal, the home network and the visited network. The home network includes a first PDN gateway that communicates with the first PDN. The visited network includes a second PDN gateway that communicates with the second PDN. The visited network includes at least one attachment point. The mobile communication terminal communicates with the visited network through the attachment point. The attachment point includes at least one of a Universal Mobile Telecommunications System (UMTS), a Long Term Evolution (LTE) Radio Access Network (RAN) and an Evolved Universal Terrestrial Radio Access Network (EU-TRAN). The attachment point communicates according to at least one of Institute of Electrical and Electronics Engineers (IEEE) standards 802.11, 802.11a, 802.11b, 802.11g, 802.11h, 802.11n, 802.16, and 802.20. The home network includes IP multimedia subsystems (IMS). The attachment module registers the mobile communication terminal with the IMS following attachment to the home network.

In other features, a home network system includes a request analysis module that analyzes a request from a mobile terminal to attach to a home network via a visited network. The home network system also includes a response module that provides a response to the mobile terminal. The response indicates that the mobile terminal is permitted to selectively connect to a first packet data network (PDN) through the home network using a first Internet protocol (IP) address and is permitted to selectively connect to a second PDN through the visited network using a second IP address. The response includes the first IP address and the second IP address arranged in a predetermined order. The response also includes the first IP address tagged with first identifiers that identify that the first IP address is used for communications with at least one of the home network and the first PDN. The response also includes the second IP address tagged with second identifiers that identify that the second IP address is used for communications with at least one of the visited network and the second PDN.

In other features, the home network system includes a connection module that sets up connectivity between the mobile communication terminal and the home network and between the mobile communication terminal and the visited network in one of parallel and series. The connection module sets up the connectivity when the mobile communication terminal is attaching to the home network. The home network system also includes memory that stores a profile of the mobile communication terminal. The profile includes at least one of a type of the mobile communication terminal and a capability of the mobile communication terminal. The capability includes a restriction that limits use of at least one of the first and second PDNs.

In other features, a network system includes the home network system. The network system also includes the mobile communication terminal. The network system also includes a visited network. The mobile communication terminal includes an attachment module that provides the request to attach when the mobile communication terminal is roaming. The network system also includes a response module that receives the response to the request from the home network.

In other features, the request to attach includes access point names (APNs) that identify at least one of the first and second PDNs. The response includes a first of the APNs appended to the first IP address and a second of the APNs appended to the second IP address. The mobile communication terminal further includes an analysis module. The analysis module determines that the mobile communication terminal is authorized to connect to at least one of the first PDN using the first IP address and the second PDN using the second IP address based on the response from the response module of the home network system. The mobile communication terminal includes a cellular network interface and a network interface.

In other features, the mobile communication terminal communicates with the visited network via at least one of the cellular network interface and the network interface. The visited network includes at least one attachment point. The mobile communication terminal communicates with the visited network through the attachment point. The attachment point includes at least one of a Universal Mobile Telecommunications System (UMTS), a Long Term Evolution (LTE) Radio Access Network (RAN) and an Evolved Universal Terrestrial Radio Access Network (EUTRAN). The attachment point communicates according to at least one of Institute of Electrical and Electronics Engineers (IEEE) standards 802.11, 802.11a, 802.11b, 802.11g, 802.11h, 802.11n, 802.16, and 802.20.

In other features, a method for operating a mobile communication terminal includes providing a request to attach to a home network through a visited network when the mobile communication terminal is roaming. The method also includes receiving a response to the request to attach from the home network that includes first and second Internet protocol (IP) addresses. The method also includes communicating with a first packet data network (PDN) through the home network by selectively using the first IP address. The method also includes communicating with a second PDN through the visited network by selectively using the second IP address. The method also includes including access point names (APNs) in the request to attach that identify at least one of the first and second PDNs.

In other features, the method includes appending a first of the APNs to the first IP address. The method also includes appending a second of the APNs to the second IP address. The method also includes including the first and second of the APNs in the response. The method also includes arranging the first IP address and the second IP address in the response in a predetermined order. The method also includes selectively communicating with the first and second PDNs based on the predetermined order. The method also includes tagging the first IP address with first identifiers that identify that the first IP address is used for communications with at least one of the home network and the first PDN.

In other features, the method includes tagging the second IP address with second identifiers that identify that the second IP address is used for communications with at least one of the visited network and the second PDN. The method also includes setting up connectivity with the home and visited networks in one of parallel and series. The method also includes setting up connectivity with the home and visited networks when the mobile communication terminal is attaching to the home network. The method also includes indicating that the mobile communication terminal has permission to selectively connect remotely to the first and second PDNs.

In other features, the method includes generating the request to attach. The request to attach includes a request to use the first and second PDNs. The method also includes determining that the mobile communication terminal is authorized to connect to at least one of the first PDN using the first IP address and the second PDN using the second IP address based on the response from the home network. The method also includes storing a profile of the mobile communication terminal. The profile includes at least one of a type of the mobile communication terminal and a capability of the mobile communication terminal. The capability includes a restriction that limits use of at least one of the first and second PDNs.

In other features, the method also includes initiating authentication of the mobile communication terminal with the home network during the attachment with the home network. The method also includes registering the mobile communication terminal with IP multimedia subsystems (IMS) of the home network following attachment to the home network.

In other features, a method for operating a home network system includes analyzing a request from a mobile terminal to attach to a home network via a visited network. The method also includes providing a response to the mobile terminal. The response indicates to the mobile terminal that the mobile terminal is permitted to selectively connect to a first packet data network (PDN) through the home network using a first Internet protocol (IP) address and is permitted to selectively connect to a second PDN through the visited network using a second IP address.

In other features, the method includes arranging the first IP address and the second IP in a predetermined order. The method also includes providing the first IP address and the second IP in the predetermined order in the response. The method also includes tagging the first IP address with first identifiers that identify that the first IP address is used for communications with at least one of the home network and the first PDN. The method also includes tagging the second IP address with second identifiers that identify that the second IP address is used for communications with at least one of the visited network and the second PDN. The method also includes setting up connectivity between the mobile communication terminal and the home network and between the mobile communication terminal and the visited network in one of parallel and series.

In other features, the method includes setting up the connectivity when the mobile communication terminal is attaching to the home network. The method also includes storing a profile of the mobile communication terminal. The profile includes at least one of a type of the mobile communication terminal and a capability of the mobile communication terminal. The capability includes a restriction that limits use of at least one of the first and second PDNs.

In other features, a mobile communication terminal includes attachment means for providing a request to attach to a home network through a visited network when the mobile communication terminal is roaming. The mobile communication terminal also includes response means for receiving a response to the request to attach from the home network that includes first and second Internet protocol (IP) addresses. The mobile communication terminal also includes communication means for communicating with a first packet data network (PDN) through the home network by selectively using the first IP address and for communicating with a second PDN through the visited network by selectively using the second IP address.

In other features, the request to attach includes access point names (APNs) that identify at least one of the first and second PDNs. The response includes a first of the APNs appended to the first IP address and a second of the APNs appended to the second IP address. The response includes the first IP address and the second IP address arranged in a predetermined order. The communication means selectively communicates with the first and second PDNs based on the predetermined order. The response includes the first IP address tagged with first identifiers that identify that the first IP address is used for communications with at least one of the home network and the first PDN.

In other features, the response includes the second IP address tagged with second identifiers that identify that the second IP address is used for communications with at least one of the visited network and the second PDN. The mobile communication terminal also includes connection means for setting up connectivity with the home and visited networks in one of parallel and series. The connection means sets up connectivity with the home and visited networks when the mobile communication terminal is attaching to the home network.

In other features, the response indicates that the mobile communication terminal has permission to selectively connect remotely to the first and second PDNs. The mobile communication terminal also includes request means for generating the request to attach. The request to attach includes a request to use the first and second PDNs. The mobile communication terminal also includes analysis means for determining. The analysis means determines that the mobile communication terminal is authorized to connect to at least one of the first PDN using the first IP address and the second PDN using the second IP address based on the response from the home network.

In other features, the mobile communication terminal also includes means for storing a profile of the mobile communication terminal. The profile includes at least one of a type of the mobile communication terminal and a capability of the mobile communication terminal. The capability includes a restriction that limits use of at least one of the first and second PDNs. The attachment means initiates authentication of the mobile communication terminal with the home network during the attachment with the home network. The network system also includes cellular network interface means for communicating and network interface means for communicating. The mobile communication terminal communicates with the visited network via at least one of the cellular network interface means and the network interface means.

In other features, a network system includes the mobile communication terminal, the home network and the visited network. The home network includes first gateway means for communicating with the first PDN. The visited network includes second gateway means for communicating with the second PDN. The visited network includes at least one attachment point means for attaching. The mobile communication terminal communicates with the visited network through the attachment point means. The attachment point means includes at least one of a Universal Mobile Telecommunications System (UMTS), a Long Term Evolution (LTE) Radio Access Network (RAN) and an Evolved Universal Terrestrial Radio Access Network (EUTRAN). The attachment point means communicates according to at least one of Institute of Electrical and Electronics Engineers (IEEE) standards 802.11, 802.11a, 802.11b, 802.11g, 802.11h, 802.11n, 802.16, and 802.20. The home network includes multimedia means for communicating. The attachment means registers the mobile communication terminal with the multimedia means following attachment to the home network.

In other features, a home network system includes request analysis means for analyzing a request from a mobile terminal to attach to a home network via a visited network. The home network system also includes response means for providing a response to the mobile terminal. The response indicates that the mobile terminal is permitted to selectively connect to a first packet data network (PDN) through the home network using a first Internet protocol (IP) address and is permitted to selectively connect to a second PDN through the visited network using a second IP address. The response includes the first IP address and the second IP address arranged in a predetermined order. The response also includes the first IP address tagged with first identifiers that identify that the first IP address is used for communications with at least one of the home network and the first PDN. The response also includes the second IP address tagged with second identifiers that identify that the second IP address is used for communications with at least one of the visited network and the second PDN.

In other features, the home network system includes connection means for setting up connectivity between the mobile communication terminal and the home network and between the mobile communication terminal and the visited network in one of parallel and series. The connection means sets up the connectivity when the mobile communication terminal is attaching to the home network. The home network system also includes means for storing a profile of the mobile communication terminal. The profile includes at least one of a type of the mobile communication terminal and a capability of the mobile communication terminal. The capability includes a restriction that limits use of at least one of the first and second PDNs.

In other features, a network system includes the home network system. The network system also includes the mobile communication terminal. The network system also includes a visited network. The mobile communication terminal includes attachment means for providing the request to attach when the mobile communication terminal is roaming. The network system also includes response means for receiving the response to the request from the home network.

In other features, the request to attach includes access point names (APNs) that identify at least one of the first and second PDNs. The response includes a first of the APNs appended to the first IP address and a second of the APNs appended to the second IP address. The mobile communication terminal further includes analysis means for determining. The analysis means determines that the mobile communication terminal is authorized to connect to at least one of the first PDN using the first IP address and the second PDN using the second IP address based on the response from the response means of the home network system. The mobile communication terminal includes cellular network interface means for communicating and network interface means for communicating.

In other features, the mobile communication terminal communicates with the visited network via at least one of the cellular network interface means and the network interface means. The visited network includes at least one attachment point means for attaching. The mobile communication terminal communicates with the visited network through the attachment point means. The attachment point means includes at least one of a Universal Mobile Telecommunications System (UMTS), a Long Term Evolution (LTE) Radio Access Network (RAN) and an Evolved Universal Terrestrial Radio Access Network (EUTRAN). The attachment point means communicates according to at least one of Institute of Electrical and Electronics Engineers (IEEE) standards 802.11, 802.11a, 802.11b, 802.11g, 802.11h, 802.11n, 802.16, and 802.20.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
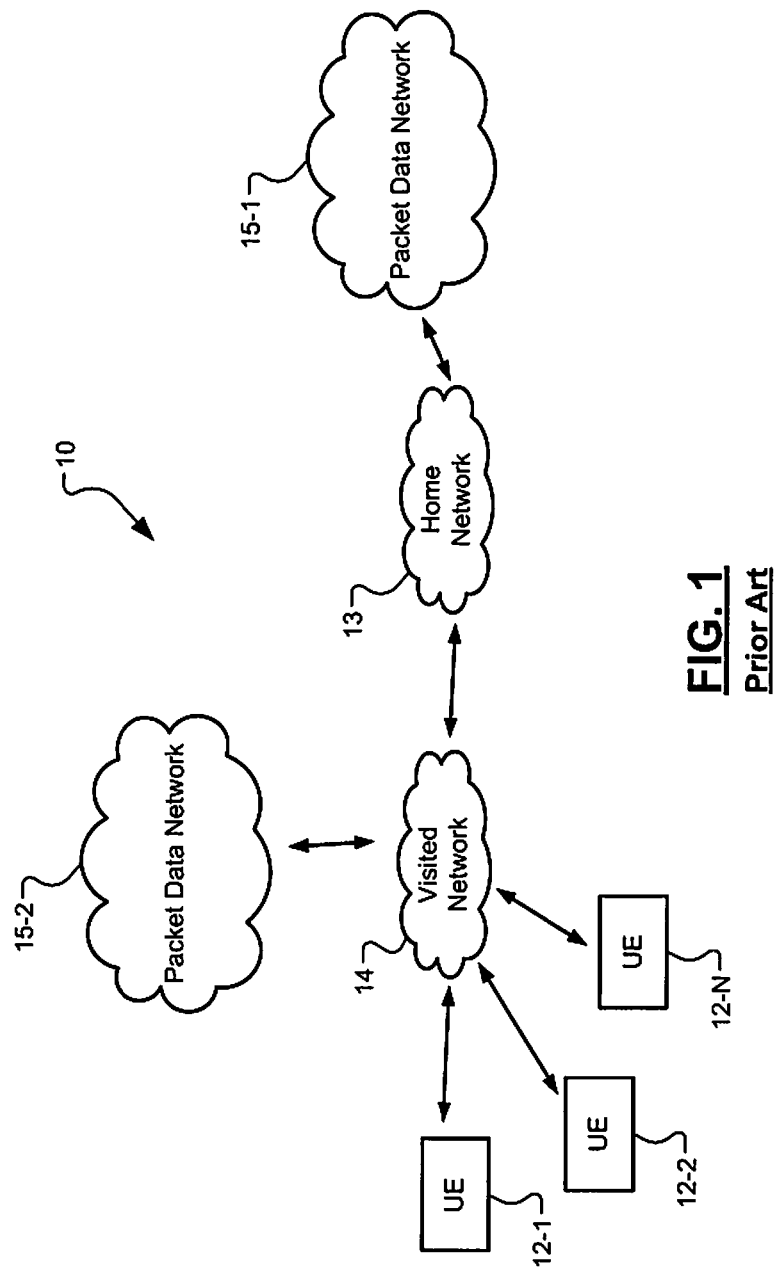
FIGS. 1-2 are functional block diagrams of an exemplary network system according to the prior art.
Figure 2:
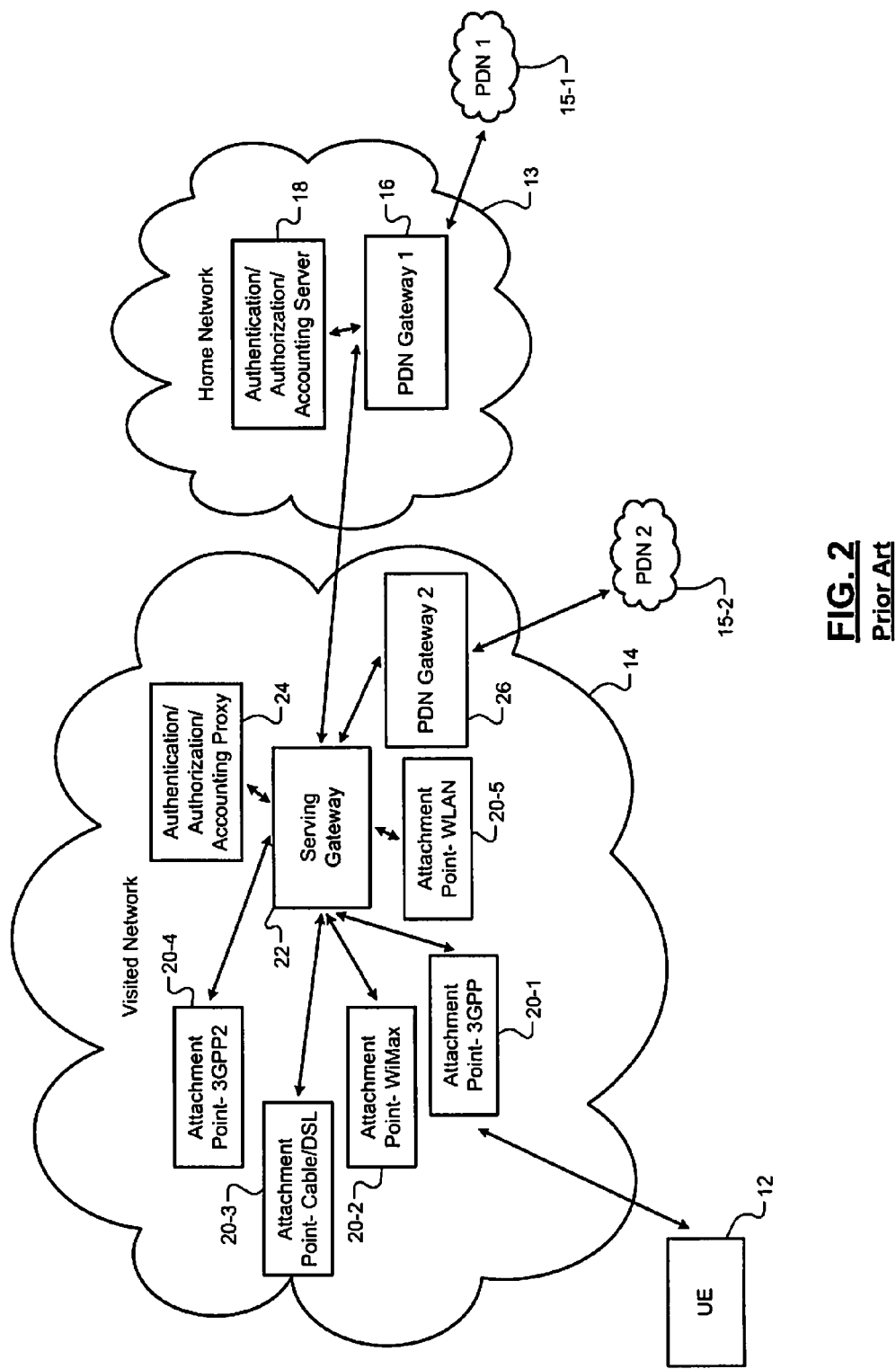
Figure 3:
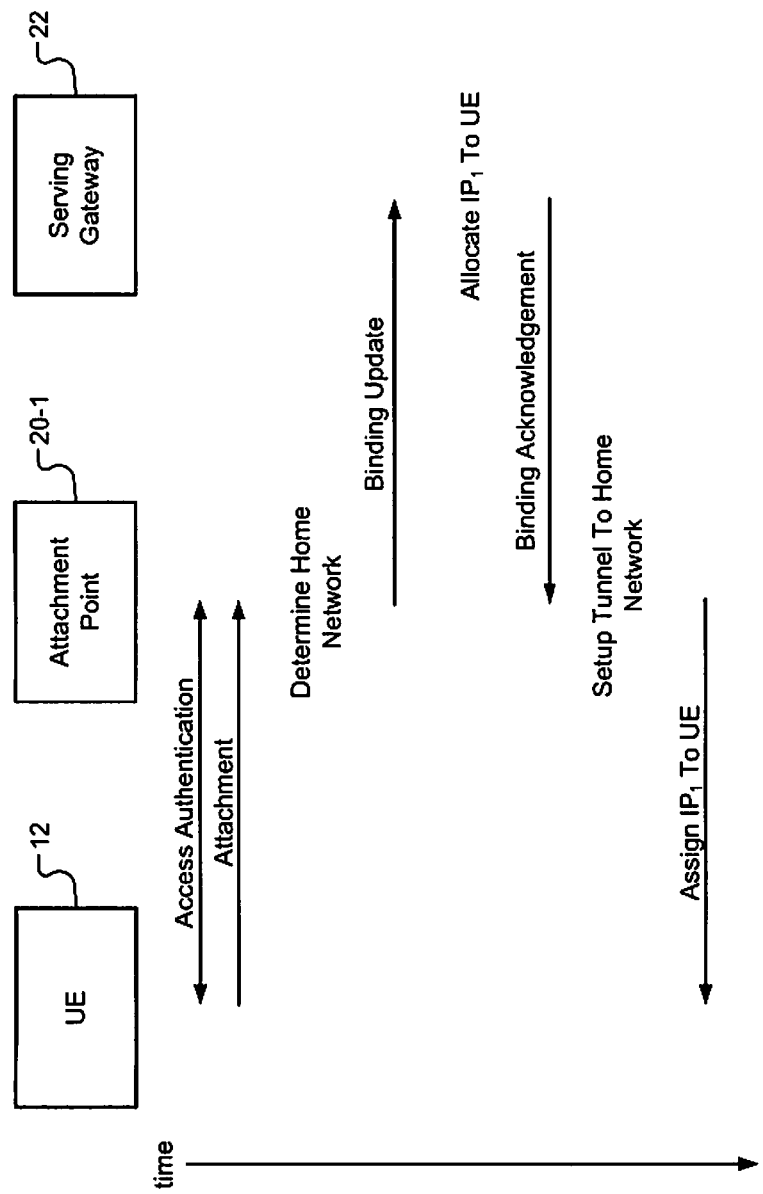
FIG. 3 is a timeline that illustrates connection of a terminal to a home network according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A first terminal may be attached to a home network and may connect with a first gateway of the home network. The first terminal may receive a first Internet protocol (IP) address when connecting. The home network may include IP multimedia subsystems (IMS) that communicate with a first packet data network (PDN) such as the Internet via the first gateway. IMS communications include, for example, voice and video communications. However, when roaming, the first terminal may attach to the home network via a visited network. The visited network may communicate with a second PDN through a second gateway. The first terminal receives a second IP address when connecting with the second gateway. Connection procedures may occur following attachment when the first terminal requires a resource in the visited or home network. The roaming first terminal may connect with the first and second PDNs through the first and second gateways using the first and second IP addresses, respectively. The first and second PDNs may or may not overlap.

Previously, the roaming first terminal may request access to a resource, such as World Wide Web browsing, that could be implemented with either the first and second PDNs. The first terminal initiated communications by attaching to the home network via the visited network and registering with the IMS in the home network. The first terminal is then connected to the first PDN even though network resources could have been spared had the first terminal connected to the second PDN instead.

Further, problems occurred when the first terminal specifically requested connection to the second PDN or the home network realized that the first terminal should be connected to the second PDN. The first terminal had to sever the attachment with the networks. The first terminal then reattached to the networks, and connectivity was set-up with the second PDN.

In the present disclosure, the first terminal and home and/or visited networks determine which PDNs the first terminal may connect with during attachment procedures or during IMS registration. The first terminal and home network may predetermine specific PDNs for use of specific resources and/or may determine the closest PDN to the first terminal that can supply the requested resources. The first terminal and home network may also exchange data so that the first terminal may differentiate IP addresses and their corresponding PDNs (for example first and second PDNs). The data exchange may occur during a single access exchange. The terminal may therefore selectively use a first IP address to communicate with a first PDN and a second IP address to communicate with a second PDN.

Figure 4:
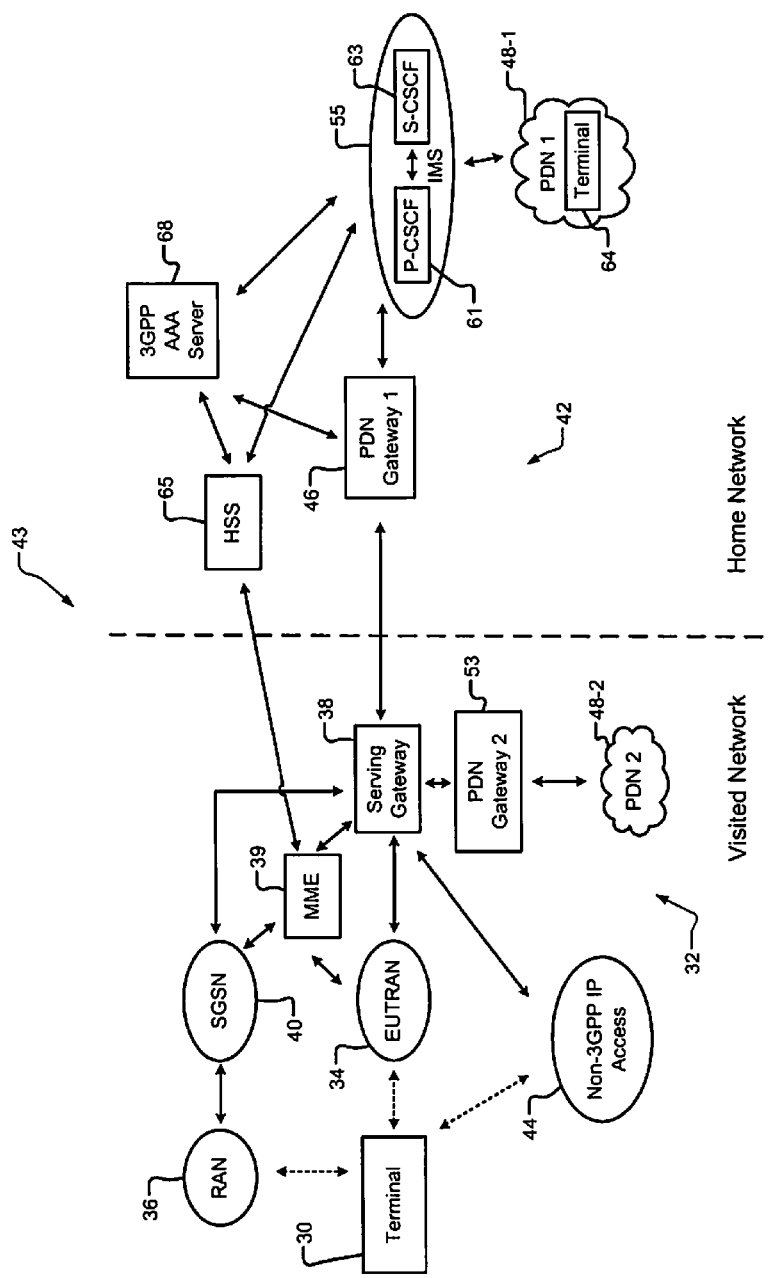
FIG. 4 is a functional block diagram of an exemplary network system according to the present disclosure.

Referring now to FIG. 4, a terminal 30 attaches to an exemplary visited network 32 through one of a plurality of attachment points. The attachment points may include a radio access network 34, such as an Evolved Universal Terrestrial Radio Access Network (EUTRAN) or a Long Term Evolution (LTE) radio access network (RAN) 36. The terminal 30 may communicate with the visited network 32 and home network 42 via the EUTRAN 34 and/or the RAN 36.

The home network 42 may include a home public land mobile network (HPLMN), and the visited network 32 may include a visited public land mobile network (VPLMN) of a $3^{rd}$ Generation Partnership Project (3GPP™) network system 43. An exemplary home network 42 communicates with one or more visited networks.

The terminal 30 may alternatively be located in a non-3GPP™ network, such as a wireless local area network (WLAN) network or Worldwide Interoperability for Microwave Access (WiMAX) network. The non-3GPP™ network may communicate with the visited network 32 and home network 42 via non-3GPP™ attachment points, which are generally identified as 44. Any of the attachment points may communicate according to any of Institute of Electrical and Electronics Engineers (IEEE) standards 802.11, 802.11a, 802.11b, 802.11g, 802.11h, 802.11n, 802.16, and 802.20, which are incorporated herein by reference in their entirety.

The visited network 32 also includes a serving gateway 38, a mobility management entity (MME) 39 that may include a 3GPP™ authentication, authorization and accounting (AAA) proxy, and a servicing general packet radio service support node (SGSN) 40.

The terminal 30 may selectively establish IP connectivity with any number of PDN gateways. For example, the terminal 30 may establish IP connectivity with a first PDN gateway 46 of the home network 42 to receive resources from a first IP multimedia network, such as the PDN 48-1. The resources may include real-time and non-real-time resources, such as Web browsing, voice over Internet phone (VoIP), electronic mail (email), real-time IP multimedia, and conversational and streaming resources.

However, the visited network 32 may also be able to provide at least some of the IP resources that the terminal 30 requires from a second PDN 48-2 associated with the visited network 32. Therefore, the terminal 30 may also selectively establish IP connectivity with a second PDN gateway 53 of the visited network 32 to receive available IP resources from the second PDN 48-2.

Use of second PDN resources by the terminal 30 may be referred to as local breakout because the terminal 30 is using resources local to the visited network 32, whereas these resources are otherwise provided by the home network 42. The serving gateway 38 of the visited network 32 may be a system architecture evolution (SAE) gateway or a wireless access gateway (WAG). The serving gateway 38 may provide a different IP address for each PDN 48-1, 48-2 from the respective gateways 16, 26. The terminal 30 may therefore be designated a first IP address from the first PDN gateway 46 to communicate with PDN 48-1 and a second IP address from the second PDN gateway 53 to communicate with PDN 48-2. The home network 42 may designate both IP addresses.

The home network 42 also includes IP multimedia subsystems (IMS) 55 that include an architectural framework for delivering the IP multimedia to the terminal 30 from the PDN 48-1. The IMS 55 includes various devices that support multimedia exchanges that may be referred to as proxy servers. Proxy servers are servers, such as computer systems or application programs, that service requests of clients, such as terminals, by forwarding requests to other servers within the PDN 48-1. Exemplary proxy servers include a proxy Call Session Control Function (P-CSCF) 61 and a serving-Call Session Control Function (S-CSCF) 63. The PDN gateway 46 may communicate with a first PDN 48-1 via the IMS 55.

The P-CSCF 61 may receive and inspect all messages received in the IMS 55. The P-CSCF 61 may also authenticate and establish security for the terminal 30 with regard to the IMS 55. The P-CSCF 61 forwards registration messages and session establishment messages to the home network 42 from the terminal 30. The P-CSCF 61 may also authorize IMS resources, control quality of service and manage IMS bandwidth.

The S-CSCF 63 sets up an IMS session and handles requests for use of multimedia delivered from the terminal 30. Requests for use of multimedia may include registration of the terminal 30 with the IMS 55 via Session Initiation Protocol (SIP) messages. SIP includes an application-layer control protocol for creating, modifying, and terminating sessions between two participants, such as the terminal 30 and a device within the PDN 48-1. An example of a device within the PDN 48-1 is another terminal 64.

To provide a service at the request of the terminal 30, the S-CSCF 63 delivers an SIP message to other entities in communication with the IMS 55, such as the terminal 64 in the PDN 48-1. The S-CSCF 63 performs session management for the IMS 55. The S-CSCF 63 handles SIP messages, which allow it to bind the location of the terminal 30 (for example, the terminal IP address) and an SIP address. The SIP address may correspond to a location of a device in one of the PDNs. Basically, the S-CSCF 63 determines to which device(s) SIP messages may be forwarded in order to provide resources requested by the terminal 30.

The MME 39 may communicate with each of the UET-RAN 34, the RAN 36, the serving gateway 38, and the SGSN 40. The MME 39 performs terminal tracking and security functions. For example, the MME 39 manages and stores terminal information. The MME 39 also generates temporary IDs. and allocates them to the terminal 30. The MME 39 also may perform authentication, authorization and accounting services in the visited network 32. The serving gateway 38 is in communication with the RAN 36 the PDN gateway 46, and the SGSN 40. The SGSN 40 may be responsible for packet routing and transfer and mobility management, which may include location management and attachment/detachment of the terminal 30 to the visited network 32. The SGSN 40 may also control logical link management and may also act as an AAA proxy server.

The home network 42 includes a home subscriber server (HSS) 65 that is in communication with an AAA server 68. The HSS 65 may consider each terminal 30 as a subscriber to a PDN 15-1 and may include authentication and subscription data required for the terminal 30 to access the PDN 48-1. The HSS 65 may also store an IP address of the AAA server 68 to which the terminal 30 is registered. The HSS 65 may also perform PDN gateway selection. The HSS 65 interfaces with the S-CSCF 63 to provide information about the location of the terminal 30 and terminal subscription information. The S-CSCF 63 interfaces with the HSS 65 and may download and upload terminal profiles.

The AAA server 68 provides AAA information and subscriber profile information. This information may be obtained from the HSS 65. For purposes of illustration, the AAA server 68 may authenticate the terminal subscription information with the HSS 65 after a request to communicate by the terminal 30.

For purposes of illustration, when accessing the PDN gateway 46, the terminal 30 generates and transmits an access authentication signal to the MME 39 via the RAN 36. The MME 39 generates and transmits an AAA request signal to the HSS 65 and/or the AAA server 68. As part of an authentication procedure the HSS 65 and/or the AAA server 68 authenticate the terminal 30 and select a PDN gateway. IP connectivity may then be established between the MME 39 and the PDN gateway 46. Following establishment of IP connectivity, an attachment procedure between the terminal 30 and the MME 39 is completed. The terminal 30 may register with a home agent (for example IMS 55) of the PDN gateway 46. The terminal 30 then receives resources from the PDN 48-1 via the PDN gateway 46.

Figure 5A:
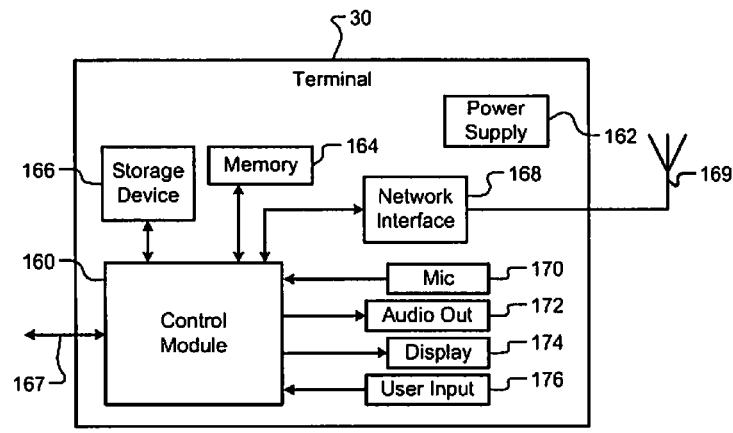
FIG. 5A is a functional block diagram of a mobile terminal according to the present disclosure.
Figure 5B:
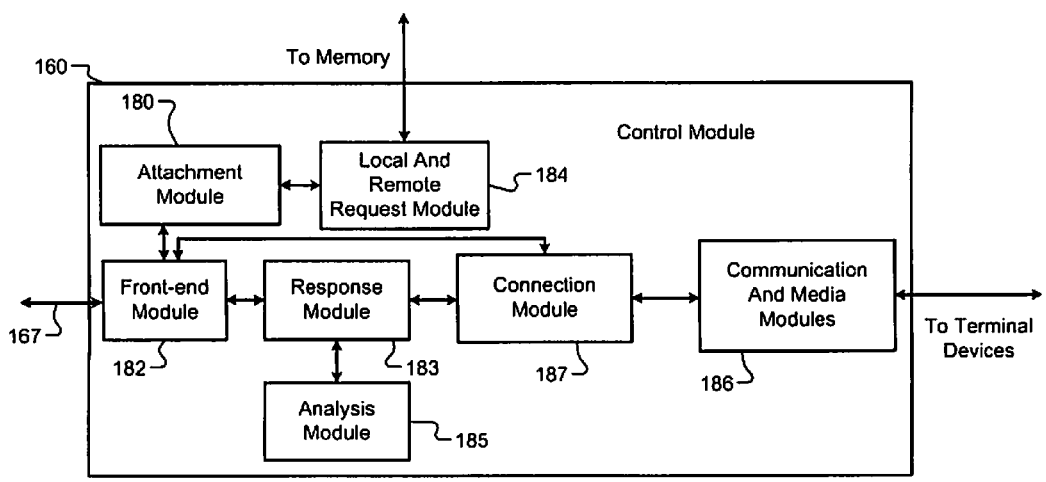
FIG. 5B is a functional block diagram of a control module for a mobile terminal according to the present disclosure.

Referring now to FIGS. 5A-5B, an example of a terminal 30, which may include a cellular phone or other type of terminal, is illustrated. The terminal 30 includes a control module 160, a power supply 162, memory 164, a storage device 166, and a cellular network interface 167. The terminal 30 may include a network interface 168, a microphone 170, an audio output 172 such as a speaker and/or output jack, a display 174, and a user input device 176 such as a keypad and/or pointing device. If the network interface 168 includes a wireless local area network interface, an antenna 169 may be included.

The control module 160 may receive input signals from the cellular network interface 167, the network interface 168, the microphone 170, and/or the user input device 176. The control module 160 may process signals, including encoding, decoding, filtering, and/or formatting, and generate output signals. The output signals may be communicated to one or more of memory 164, the storage device 166, the cellular network interface 167, the network interface 168, and the audio output 172.

The memory 164 may store a terminal profile. The terminal profile may indicate the type of terminal and the capabilities of the terminal 30. The capabilities of the terminal 30 may include restrictions to predetermined PDNs and/or devices within predetermined PDNs. The memory 164 may also include Access Point Names (APNs) that identify respectively the multiple PDNs that the terminal may establish connectivity with. An APN may be the name of an access point for a 3GPP network. An access point may include a PDN to which a mobile terminal can be connected, a set of settings which are used for that connection, and/or a particular option in a set of settings in the terminal 30.

The memory 164 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 166 may include an optical storage drive, such as a DVD drive, and/or a hard disk drive (HDD). The power supply 162 provides power to the components of the terminal 30.

The control module 160 may include an attachment module 180 that initiates attachment and authentication procedures via a front-end module 182. The control module 160 may also include a local and remote request module 184 that requests use of network resources, such as resources in the first and/or second PDNs 48-1, 48-2. The request module 184 may therefore request access to both PDNs 48-1, 48-2 during attachment procedures of the attachment module 180. The request may include a descriptor that includes APNs that indicate particular PDNs and/or network services. The descriptors may be included in the form of a structured string.

A receiving entity in the visited network, such as an attachment point, may detect and split the descriptor string into the single APNs and then proceed to set-up connectivity to the PDN corresponding to each APN. Alternatively, the home network 42 receives the descriptor string and provides a response based on the descriptor string. The home network 42 may also include a similar APN descriptor string in a terminal profile stored in memory.

The control module 160 may receive responses from the home network 42 in a response module 183 that indicate that the terminal 30 may connect with the first and/or second PDNs 48-1, 48-2. The responses may include respective IP addresses for the connections. The responses may also include descriptors and/or tags for the IP addresses that indicate the particular PDNs associated with the particular IP addresses. The control module 160 may also include an analysis module 185 that may recognize the descriptors and/or tags. The analysis module 185 may also determine that the terminal 30 is authorized to connect to the PDNs 28-1, 48-2 based on the response from the home network 42.

Authorization to use the first and/or second PDNs 48-1, 48-2 may be provided from the home network 42 independent of connections with the PDNs 48-1, 48-2. The control module 160 also includes communications and media modules 186 that provide control for various terminal devices. Examples of terminal devices include the network interface 168, the microphone 170, and/or the user input device 176. The communications and media modules 186 may communicate with PDNs based on the descriptors and/or tags via use of the appropriate IP address designated by the descriptors and/or tags. The control module 160 may also include a connection module 187 that controls and sets-up connectivity between the home and visited networks 42, 32 and the terminal 30. Connectivities may be set-up in parallel or in series and may be set-up during attachment between the terminal 30 and the networks 42, 32. The connection module 187 may selectively use $IP_1$ to communicate with the first PDN 48-1 and $IP_2$ to communicate with the second PDN 48-2.

Figure 6:
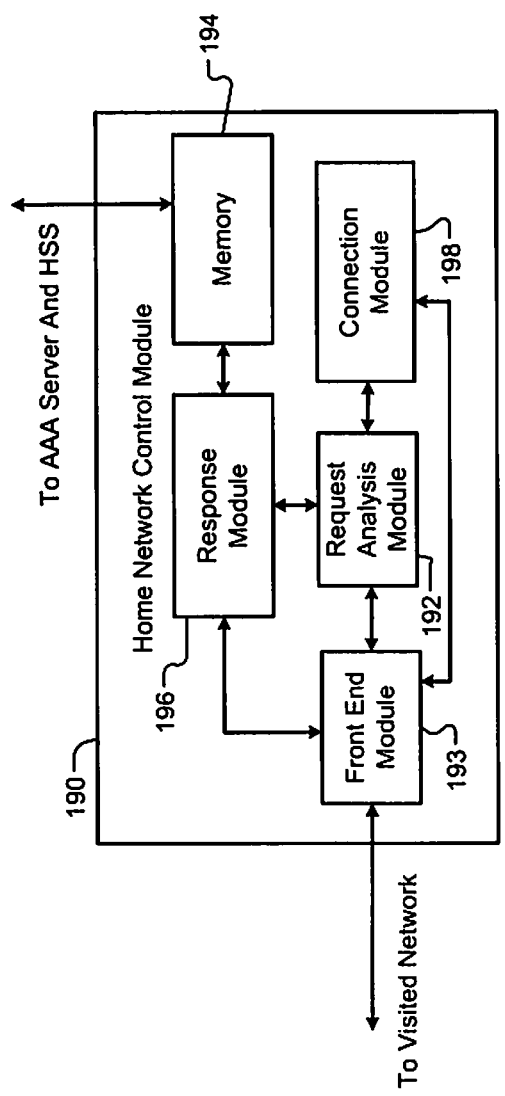
FIG. 6 is a functional block diagram of a control module for a home network according to the present disclosure.

Referring now to FIG. 6, an exemplary home network control module 190 is illustrated. The control module 190 may be included in any of the home network devices illustrated in FIG. 4, such as the IMS 55 and the PDN gateway 46, and/or may be in remote communication with any or all of the home network devices. The control module 190 includes a request analysis module 192 that receives and analyzes requests from the terminal 30 to use resources. The requests may be received and processed in a front end module 193. The requests may be received during attachment procedures and prior to SIP registration procedures.

The control module 190 may also include memory 194 that includes profiles of various terminals. The memory 194 may also include APNs that correspond to respective PDNs and that may be associated with the various terminals. The request analysis module 192 may analyze the requests based on available resources within the home network 42 and/or based on the profiles. The profiles may be based on, for example, subscription information. For example, a profile for the terminal 30 may indicate that the terminal 30 is authorized (i.e. has a subscription) to browse the Internet and/or authorized to communicate locally in visited networks when roaming.

A response module 196 of the control module generates responses to the requests that may include authorization for the terminal 30 to connect to the first and/or second PDNs

48-1, 48-2. The responses may be based on the profile and/or on requests by the terminal 30 to use specific PDNs. The requests may include APNs corresponding to the APNs provided by the terminal 30 that designate particular PDNs. The responses may also include other information that distinguishes between IP addresses.

For example, a response may include IP addresses arranged in a predetermined order. For example, $IP_1$ may be first and $IP_2$ may be second and vise versa. The terminal 30 may recognize that the first listed address ($IP_1$) corresponds to the IP address that the terminal 30 may use when communicating with PDN1 48-1. Likewise, the terminal 30 may recognize that the second listed address ($IP_2$) corresponds to the IP address that the terminal 30 may use when communicating with PDN2 48-2. Alternatively, the terminal 30 may merely recognize that $IP_1$ is used for communications with the home network 42, and $IP_2$ is used for communications with the visited network 32 based on the order in the response.

Alternatively, a response from the home network 42 may include data, such as a descriptor and/or a tag, associated with one or more of the IP addresses. An exemplary descriptor may be sent concurrently with the IP addresses. An exemplary tag may be appended to the addresses themselves. The descriptor or tag may identify particular PDNs for the IP address and/or whether the IP address is used to communicate with the home or visited networks 42, 32.

For example, the home network 42 may provide explicit indication of the usage for the IP addresses for the terminal 30 by tagging the IP addresses with an address identification field. For example, the address identification field may include a label that identifies the IP address, such as "IMS signaling", "primary address", "home network address" for the IP address provided by the home network 42. The label may also include "IMS media", "secondary address", "visited network address" for the IP address provided by the visited network 32. Various other labels may also be used that provide an indication of the scope of usage provided by a particular IP address. The terminal 30 may recognize the descriptors and/or tags and may communicate with PDNs based on the descriptors and/or tags via use of the appropriate IP address designated by the descriptors and/or tags.

The control module 190 may also include a connection module 198 that sets up connectivity with the terminal 30 in parallel or series. The serving gateway 38 may provide separate IP addresses for communications with the first and second PDNs 48-1, 48-2 based on the responses. The terminal 30 may receive the IP addresses and the responses and may connect to devices locally in the second PDN 48-2 based on the responses. IMS communications with the home network 42 may be referred to as IMS signaling, and IMS communications with the visited network 32 may be referred to as IMS media. IMS communications may occur after connectivity is set-up between the terminal 30 and the home and visited networks 42, 32.

Figure 7A:
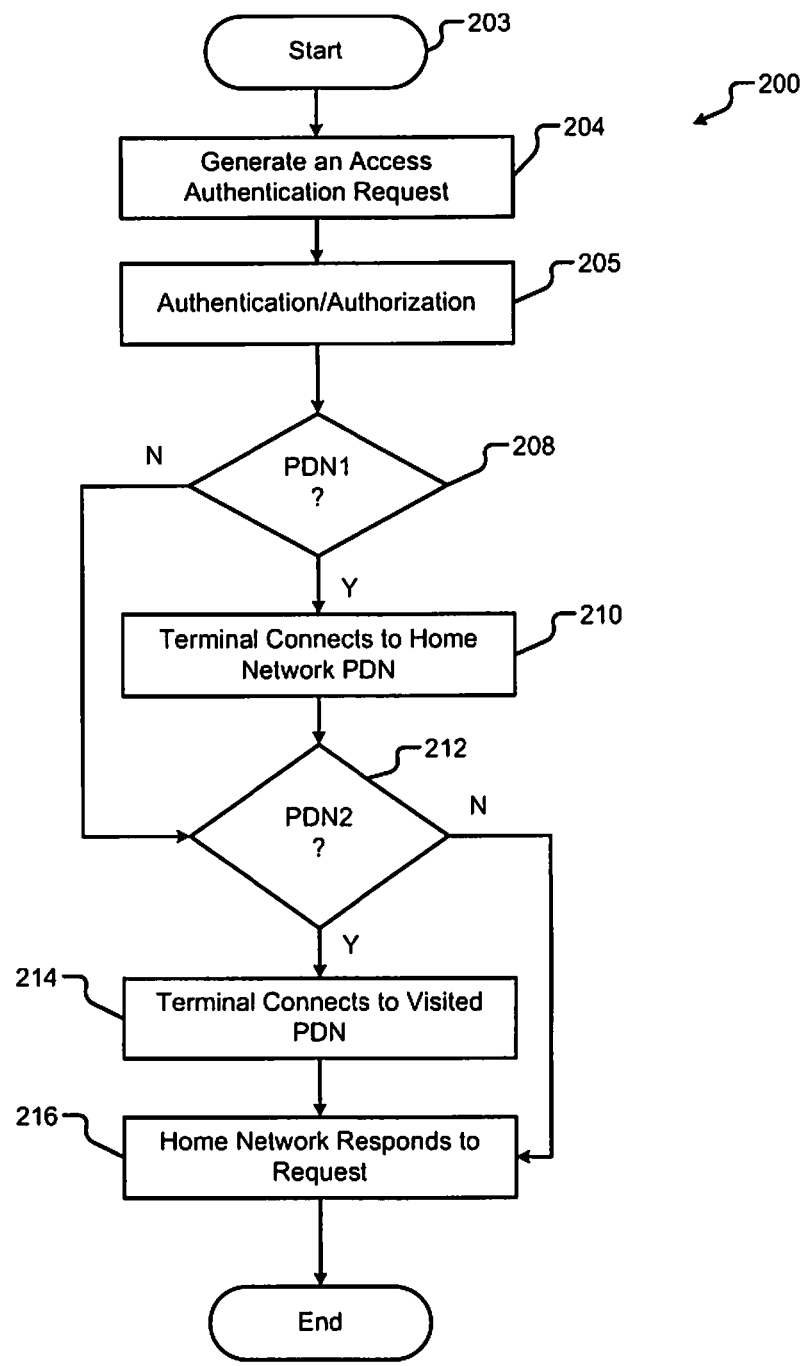
FIG. 7A is a block diagram that illustrates a method for operating a network system according to the present disclosure.
Figure 7B:
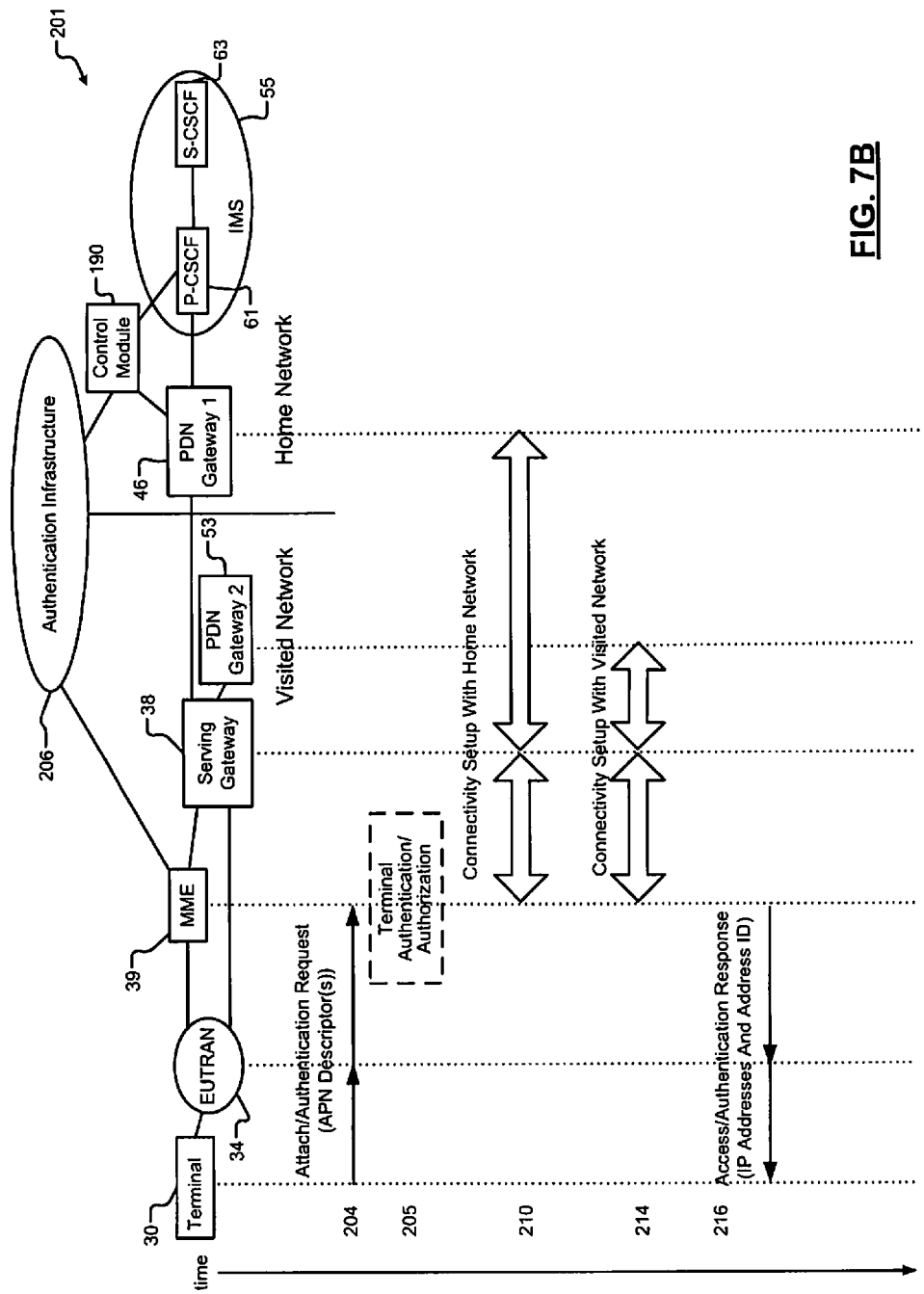
FIGS. 7B-7C are timelines that illustrate methods for operating a network system according to the present disclosure.
Figure 7C:
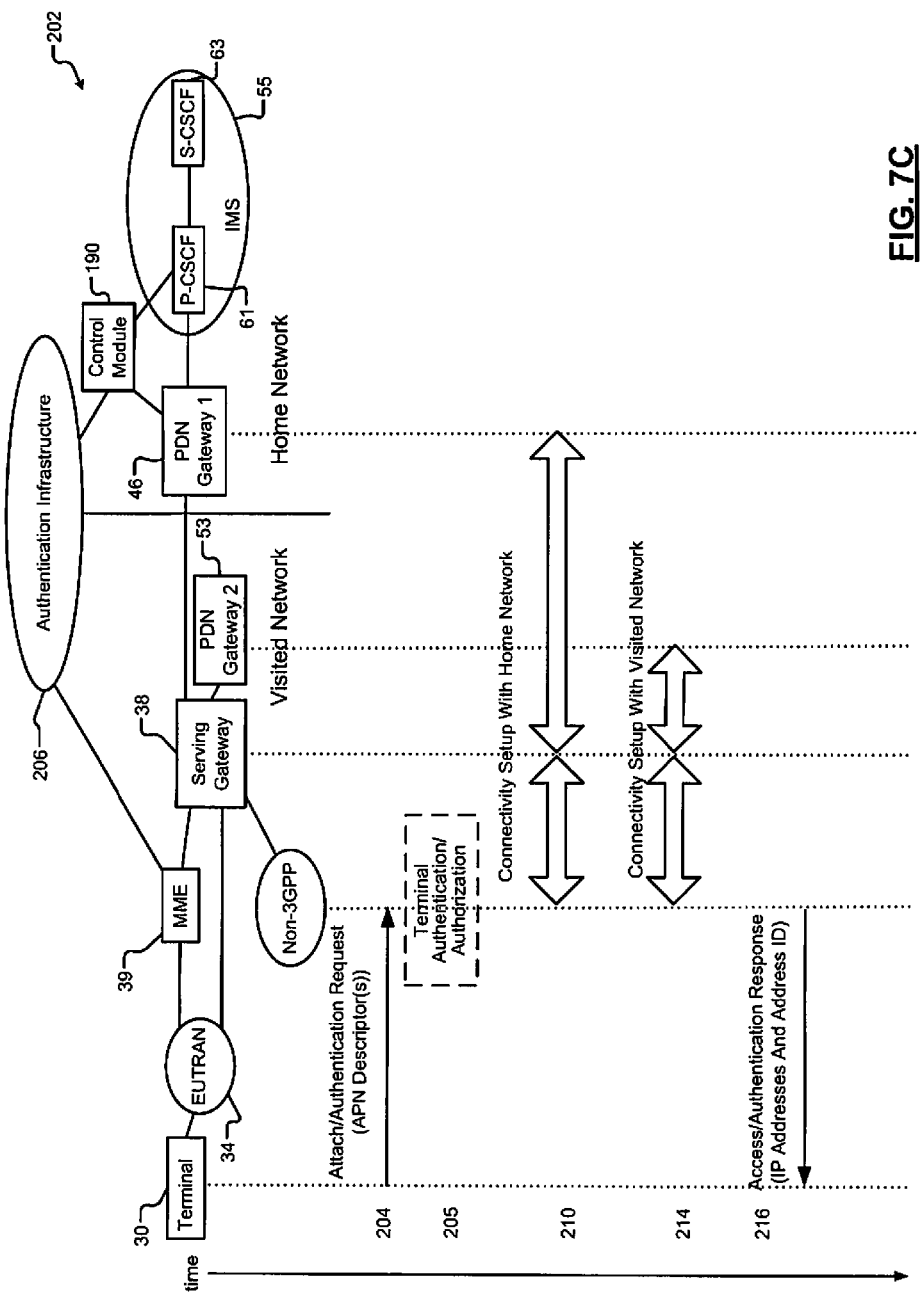

Referring now to FIG. 7A, a block diagram 200 illustrates a method for operating a network system. Further, FIGS. 7B-7C illustrate timelines 201, 202 of steps performed based on the method for operating a network system. Control starts in step 203.

In step 204, the terminal 30 generates an attachment request. The request may include a descriptor that includes APNs that indicate particular PDNs and/or network services. The request may also include a request that the home network 42 authorize connectivity. For example, the terminal 30 may request connectivity with the home network 42 and/or the visited network 32. According to FIG. 7B, in step 205, the terminal 30 performs attachment and authentication with the attachment point, such as the EUTRAN 34. This may include communicating with the AAA server 68 via the MME 39. According to FIG. 7C, in step 205, the terminal 30 performs attachment and authentication with the non-3GPP attachment point 44. This may include communicating with the serving gateway 38.

Exemplary authentication exchanges between the terminal 30 and the networks 32, 42 are described in 3GPP TS 23.401 v0.3.0 and 3GPP TS 23.402 v0.3.0, which are incorporated by reference herein in their entirety. Generally, the AAA server 68, the MME 39 and/or the serving gateway 38 may provide connectivity permission to the terminal 30 for multiple PDNs as part of the authentication procedure. Further, the AAA server 68, the MME 39 and/or the serving gateway 38 may provide the permission either in response to the terminal request or based on other criteria. Other criteria may include, for example, the type of terminal making the request and/or network policies. An exemplary network policy may forbid local breakout, and therefore the AAA server 68, the MME 39 and/or the serving gateway 38 may only authorize connections to PDNs of the home network 42.

The authentication infrastructure 206 may implement the authentication messages and may include, for example, portions of the HSS 65, the AAA server 68 and the AAA proxy server, which may be included in the MME 39. For the part of the authentication procedure taking place between the visited and the home networks 32, 42, additional parameters may be provided by the home network 42 to the visited network 32. The parameters may indicate the need of the terminal 30 to communicate with multiple PDNs. The parameters may also indicate with which PDNs the terminal 30 may communicate.

During or after authentication, in step 208, the MME 39 may determine if the terminal 30 may connect with the home network 42. If permitted, in step 210, the MME 39 attempts to set up connectivity with the home network 42. In step 212, the MME 39 determines whether the terminal 30 may connect with the visited network 32. If permitted, in step 214, the MME 39 attempts to set up connectivity with home network 42. The MME 39 may connect to the home and visited networks 42, 32 in parallel or in series. For series connections, the MME 39 may set-up connectivity with the home network 42 before the visited network 32 and vise versa.

For steps 210 and 214, respectively, the terminal 30 may first request to attach to the EUTRAN 34. The AAA server 68 and/or the MME 39 may use an identifier of the terminal 30, such as a network address identifier, that uniquely identifies the terminal 30. The attachment request may request IP addresses from the EUTRAN 34 and may request attachment to PDNs associated with specific APNs and/or network services. The EUTRAN 34 communicates with the serving gateway 38, and the serving gateway 38 in turn may request IP addresses, $IP_1$, $IP_2$, respectively, from the PDN gateways 46, 53. Alternatively, the EUTRAN 34 may request IP addresses from the home network 42.

The address $IP_1$ is used for communications with the terminal 30 and the PDN gateway 46, and the address $IP_2$ is used for communications with the terminal 30 and the PDN gateway 53. When the terminal 30 sends a packet destined for the PDN 48-1, that packet may appear to originate from the PDN gateway 46 with a source address of $IP_1$. In addition, packets destined for the terminal 30 are sent to the PDN gateway 53 with a destination of $IP_1$. Likewise, when the terminal 30 sends a packet destined for the PDN 48-2, that packet may appear to originate from the PDN gateway 53 with a source address of $IP_2$. In addition, packets destined for the terminal 30 are sent to the PDN gateway 53 with a destination of $IP_2$.

The PDN gateways 46, 53 send binding acknowledgement messages including IP$_1$ and IP$_2$ to the EUTRAN 34. A tunnel is then set up between the EUTRAN 34 and one of the PDN gateways 46, 53 for transmission of packets to and from the terminal 30. The EUTRAN 34 then may assign IP$_1$ and/or IP$_2$ to the terminal 30.

In step 216, the home network 42, for example, the AAA server 68 of the home network 42 and/or the MME 39, may inform the terminal 30 that the terminal 30 has set-up connectivity with the home network 42 and/or with the visited network 32. The home network 42 informs the terminal 30 via, for example a response to the attachment request of step 203. The home network 42 may inform the terminal 30 which IP address corresponds to which PDN or network service. For example, the home network 42 may receive a request from the terminal 30, analyze the request and provide a response based on the analysis. The request may include APNs corresponding to PDNs. The analysis may include checking a terminal profile, the specific visited network where the terminal 30 is roaming, APNs and/or additional criteria.

The home network 42 may associate an IP address with each PDN and may respond to the terminal 30 with this information. For example, the home network 42 may tag the IP addresses with the APNs so that the terminal 30 recognizes the APN/PDN with which the IP address is used. The home network 42 may also provide the IP addresses in a predetermined order that the terminal 30 may recognize. For example, IP$_1$ is associated with the first PDN and/or APN; and IP$_2$ is associated with the second PDN and/or APN. The terminal 30 may therefore selectively use IP$_1$ to communicate with the first PDN 48-1 and IP$_2$ to communicate with the second PDN 48-2.

Figure 8A:
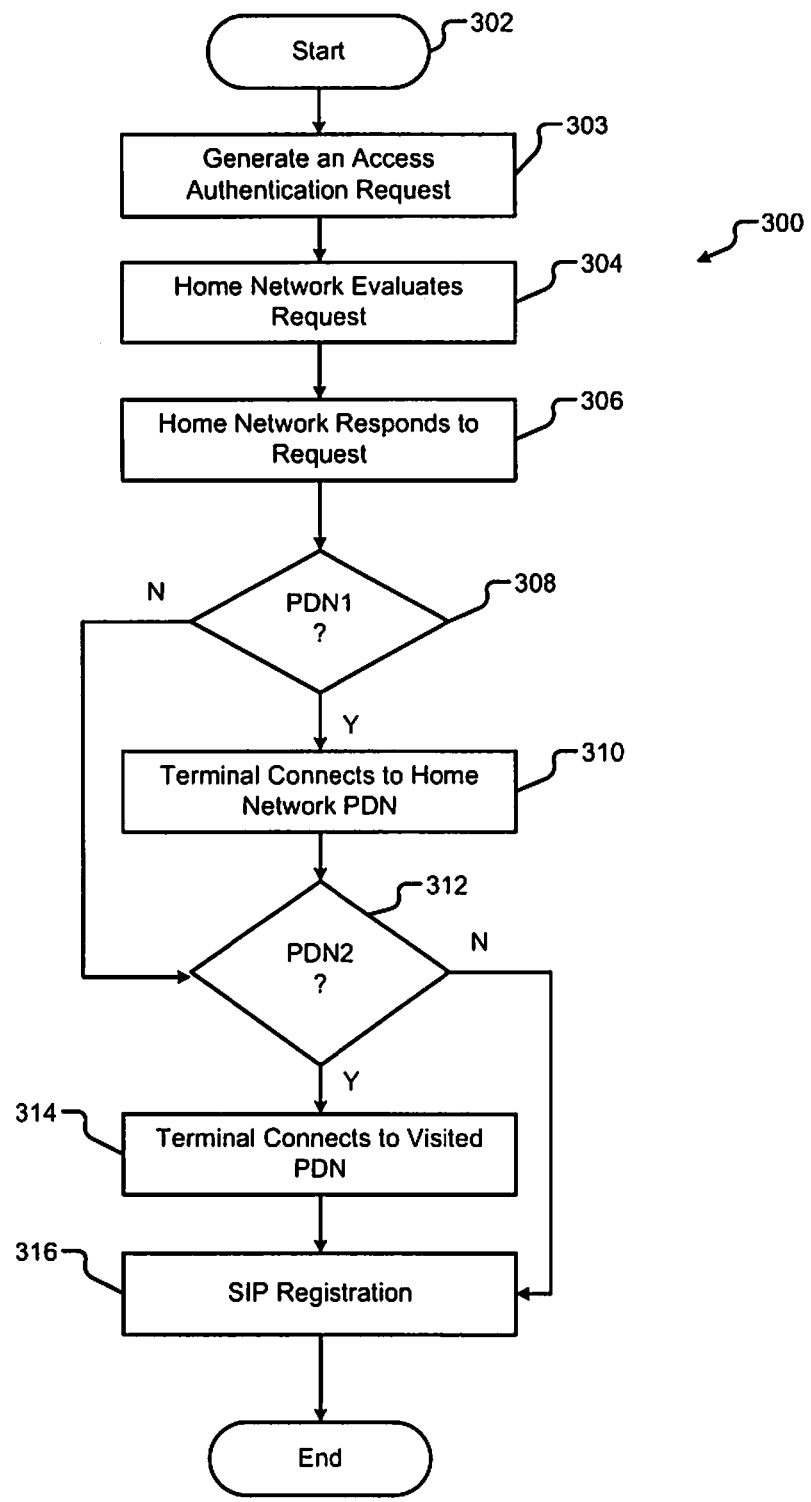
FIG. 8A is a block diagram that illustrates a method for operating a network system according to the present disclosure.
Figure 8B:
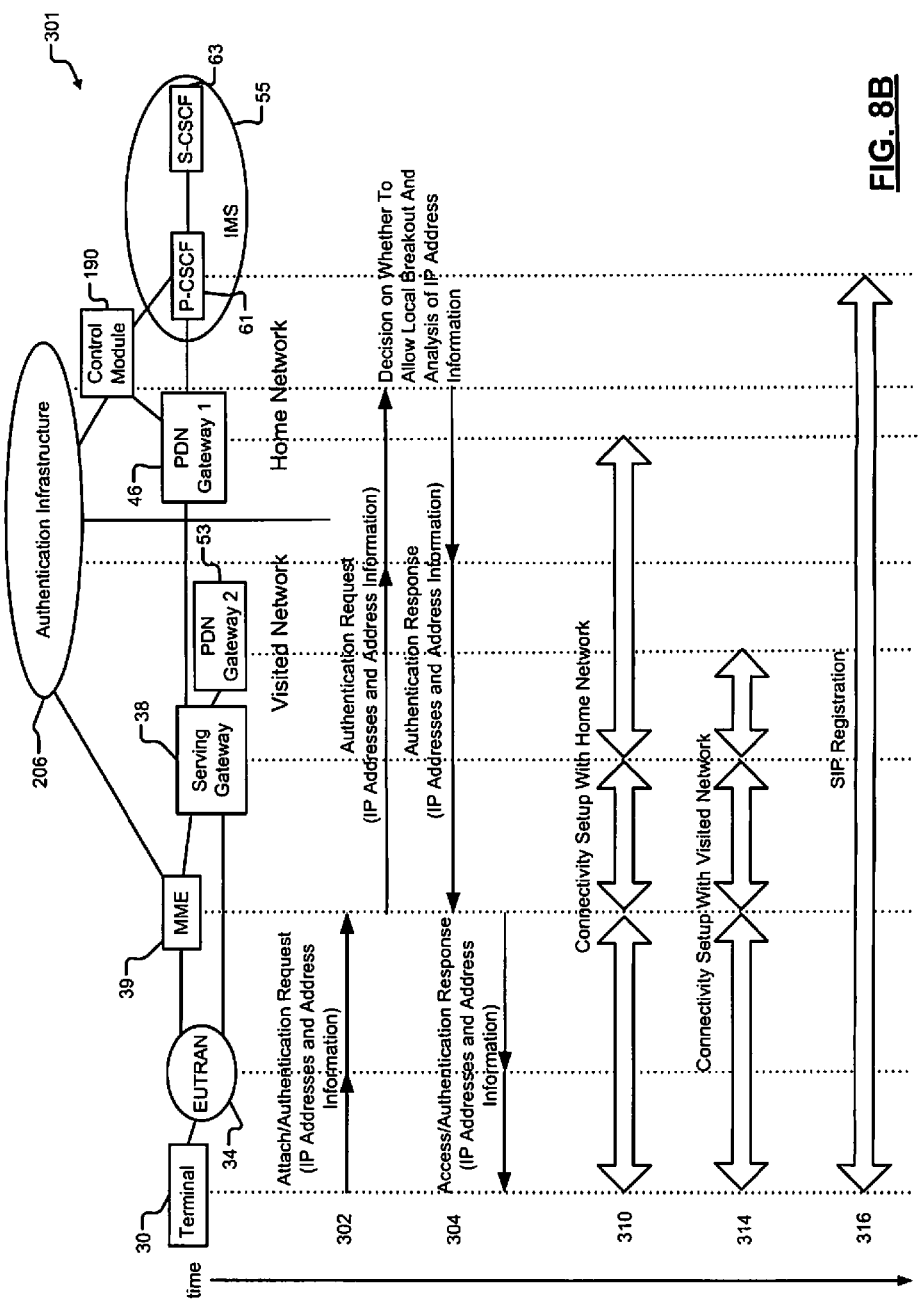
FIG. 8B is a timeline that illustrates a method for operating a network system according to the present disclosure.

Referring now to FIG. 8A, a block diagram 300 illustrates a method for operating a network system. Further, FIG. 8B illustrates a timeline 301 of steps performed based on the method for operating a network system. In FIGS. 8A and 8B, the terminal 30 sends attachment requests, and the home network 42 responds to the attachment requests before network connectivities are set-up.

Control starts in step 302. In step 303, the terminal 30 performs attachment and authentication with the attachment point, such as the EUTRAN 34. This may include communicating with the AAA server 68 via the MME 39. The terminal 30 may also request that the home network 42 authorize connectivity. For example, the terminal 30 may request connectivity with the home network 42 and/or the visited network 32.

In step 304, the home network 42, for example, the AAA server 68 of the home network 42 and/or the MME 39, may indicate that the terminal 30 may set-up connectivity with the home network 42 and/or with the visited network 32. In step 306, the home network 42 may provide an indication to the terminal 30 directly, in which case the terminal 30 sets up connectivity to multiple PDNs. The home network 42 may also provide information on which PDNs the terminal 30 may set-up the connectivity. The home network 42 may also provide IP addresses for the PDNs and may indicate which IP address corresponds to a particular PDN. The home network 42 may alternatively supply information relating to the IP addresses where the IP addresses are provided from various devices in the network system 43, such as the PDN gateways 46, 53.

Exemplary authentication messages are described in 3GPP TS 23.401 v0.3.0 and 3GPP TS 23.402 v0.3.0, which are incorporated by reference herein in their entirety. The authentication infrastructure 206 may implement the authentication messages and may include, for example, portions of the HSS 65, the AAA server 68 and the AAA proxy server, which may be included in the MME 39. The home network 42 may therefore provide authentication messages along with the additional information regarding terminal access to the networks 42, 32 and IP address information for the PDNs 48-1, 48-2.

For the part of the authentication procedure taking place between the visited and the home networks 32, 42, additional parameters may be provided by the home network 42 to the visited network 32. The parameters may indicate the need of the terminal 30 to communicate with multiple PDNs. The parameters may also indicate with which PDNs the terminal 30 may communicate. During the authentication procedure, the home network 42 may inform the terminal 30 that the terminal 30 may obtain both an IP address in the home network 42 and an IP address in the visited network 32. The home network 42 may, for example, inform the terminal 30 based on a terminal profile, APNs provided by the terminal 30, the specific visited network where the terminal 30 is roaming, and/or additional criteria.

Generally, the AAA server 68 and/or the MME 39 may provide connectivity permission to the terminal 30 for multiple PDNs as part of the authentication procedure. Further, the AAA server 68 and/or the MME 39 may provide the permission either in response to the terminal request or based on other criteria. Other criteria may include, for example, the type of terminal making the request and/or network policies. An exemplary network policy may forbid local breakout, and therefore the AAA server 68 and/or the MME 39 may only authorize connections to PDNs of the home network 42.

Alternatively, the home network 42 may provide an indication of allowed PDNs and their respective IP addresses to the visited network 32 in response to any request to use resources of the home network 42. For this example, the attachment points, such as the EUTRAN 34, set up multiple connectivities with multiple PDNs automatically and do not require permission from the home network 42.

Upon authentication, in step 308, the terminal 30 determines whether it may connect with the home network 42. If permitted, in step 310, the terminal 30 attempts to set up connectivity with the home network 42. In step 312, the terminal 30 determines whether it may connect with the visited network 32. If permitted, in step 314, the terminal 30 attempts to set up connectivity with the visited network 32.

For steps 310 and 314, respectively, the terminal 30 may first request to attach to the EUTRAN 34. The AAA server 68 and/or the MME 39 may use an identifier of the terminal 30, such as a network address identifier, that uniquely identifies the terminal 30. The attachment request requests an IP address from the EUTRAN 34. The EUTRAN 34 communicates with the serving gateway 38, and the serving gateway 38 in turn requests IP addresses, IP$_1$, IP$_2$, respectively, from the PDN gateways 46, 53 and/or the home network 42.

The PDN gateways 46, 53 send binding acknowledgement messages including IP addresses to the EUTRAN 34. The home network 42 may tag or otherwise affect the binding acknowledgement messages and or the IP addresses with data that identifies which PDN corresponds to each IP address. A tunnel is then set up between the EUTRAN 34 and one of the PDN gateways 46, 53 for transmission of packets to and from the terminal 30. The EUTRAN 34 then assigns IP$_1$ and/or IP$_2$ to terminal 30. The terminal 30 then selectively uses IP$_1$ to communicate with the first PDN 48-1 and IP$_2$ to communicate with the second PDN 48-2 based on the data tagged to the IP addresses from the home network 42. In step 316, the terminal may then register with the IMS 55 using a SIP. Exemplary SIP registration is specified in 3GPP TS 23.228, which is incorporated by reference herein in its entirety.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A mobile communication terminal, comprising:
an attachment module configured to provide, during attachment and prior to completing attachment and connection to either of a home network and a visited network, a request to attach to the home network through the visited network when the mobile communication terminal is roaming, wherein the request includes i) a request to use a first packet data network (PDN) associated with the home network, and ii) a request to use a second PDN associated with the visited network;
a response module configured to receive a response to the request to attach from the home network, wherein the response includes i) a first tag associating a first IP address with the first PDN, and ii) a second tag associating a second IP address with the second PDN; and
a communication module configured to
communicate with the first PDN through the home network by selectively using the first IP address, and
communicate with the second PDN through the visited network by selectively using the second IP address;
wherein the request to attach includes access point names (APNs) that identify at least one of the first PDN and the second PDN; and
wherein the response includes i) a first of the APNs appended to the first IP address, and ii) a second of the APNs appended to the second IP address.

2. The mobile communication terminal of claim 1, wherein the response includes the first IP address and the second IP address arranged in a predetermined order.

3. The mobile communication terminal of claim 2, wherein the communication module is configured to selectively communicate with the first PDN and the second PDN based on the predetermined order.

4. The mobile communication terminal of claim 1, further comprising a connection module configured to set up connectivity with the home and visited networks in one of parallel and series.

5. The mobile communication terminal of claim 4, wherein the connection module is configured to set up connectivity with both the home network and the visited network when the mobile communication terminal is attaching to the home network.

6. The mobile communication terminal of claim 1, wherein the response indicates that the mobile communication terminal has permission to selectively connect remotely to the first PDN and the second PDN.

7. The mobile communication terminal of claim 1, further comprising an analysis module configured to determine, based on the response from the home network, that the mobile communication terminal is authorized to connect to at least one of i) the first PDN using the first IP address, and ii) the second PDN using the second IP address.

8. The mobile communication terminal of claim 1, further comprising memory configured to store a profile of the mobile communication terminal, wherein the profile includes at least one of a type of the mobile communication terminal and a capability of the mobile communication terminal, wherein the capability includes a restriction that limits use of at least one of the first PDN and the second PDN.

9. The mobile communication terminal of claim 1, wherein the attachment module is configured to initiate authentication of the mobile communication terminal with the home network during the attachment with the home network.

10. The mobile communication terminal of claim 1, further comprising a cellular network interface and a network interface, wherein the mobile communication terminal is configured to communicate with the visited network via at least one of the cellular network interface and the network interface.

11. A network system, comprising:
the mobile communication terminal of claim 1;
the home network; and
the visited network.

12. The network system of claim 11, wherein the home network includes a first PDN gateway configured to communicates with the first PDN, and wherein the visited network includes a second PDN gateway that communicates with the second PDN.

13. The network system of claim 11, wherein the visited network includes at least one attachment point, wherein the mobile communication terminal is configured to with the visited network through the attachment point.

14. The network system of claim 13, wherein the attachment point includes at least one of a Universal Mobile Telecommunications System (UMTS), a Long Term Evolution (LTE) Radio Access Network (RAN) and an Evolved Universal Terrestrial Radio Access Network (EUTRAN).

15. The network system of claim 13, wherein the attachment point is configured to communicate according to at least one of Institute of Electrical and Electronics Engineers (IEEE) standards 802.11, 802.11a, 802.11b, 802.11g, 802.11h, 802.11n, 802.16, and 802.20.

16. The network system of claim 11, wherein the home network includes IP multimedia subsystems (IMS), wherein the attachment module is configured to register the mobile communication terminal with the IMS following attachment to the home network.

17. A method for operating a mobile communication terminal, the method comprising:
during attachment and prior to completing attachment and connection to either of a home network and a visited network, providing a request to attach to the home network through the visited network when the mobile communication terminal is roaming, wherein the request includes i) a request to use a first packet data network (PDN) associated with the home network, and (ii) a request to use a second PDN associated with the visited network;
receiving a response to the request to attach from the home network, wherein the response includes i) a first tag associating a first IP address with the first PDN, and ii) a second tag associating the second IP address with a second PDN;
communicating with the first PDN through the home network by selectively using the first IP address; and
communicating with the second PDN through the visited network by selectively using the second IP address;
including access point names (APNs) in the request to attach that identify at least one of the first PDN and the second PDN;
appending a first of the APNs to the first IP address;
appending a second of the APNs to the second IP address; and
including the first and second of the APNs in the response.

18. The method of claim 17, further comprising arranging the first IP address and the second IP address in the response in a predetermined order.

19. The method of claim 18, further comprising selectively communicating with the first PDN and the second PDN based on the predetermined order.

20. The method of claim 17, further comprising setting up connectivity with the home network and the visited network in one of parallel and series.

21. The method of claim 20, further comprising setting up connectivity with both the home network and the visited network when the mobile communication terminal is attaching to the home network.

22. The method of claim 17, further comprising indicating that the mobile communication terminal has permission to selectively connect remotely to the first PDN and the second PDN.

23. The method of claim 17, further comprising determining, based on the response from the home network, that the mobile communication terminal is authorized to connect to at least one of i) the first PDN using the first IP address, and ii) the second PDN using the second IP address.

24. The method of claim 17, further comprising storing a profile of the mobile communication terminal, wherein the profile includes at least one of a type of the mobile communication terminal and a capability of the mobile communication terminal, wherein the capability includes a restriction that limits use of at least one of the first PDN and the second PDN.

25. The method of claim 17, further comprising initiating authentication of the mobile communication terminal with the home network during the attachment with the home network.

26. The method of claim 17, further comprising registering the mobile communication terminal with IP multimedia subsystems (IMS) of the home network following attachment to the home network.

* * * * *